Patented Sept. 11, 1923.

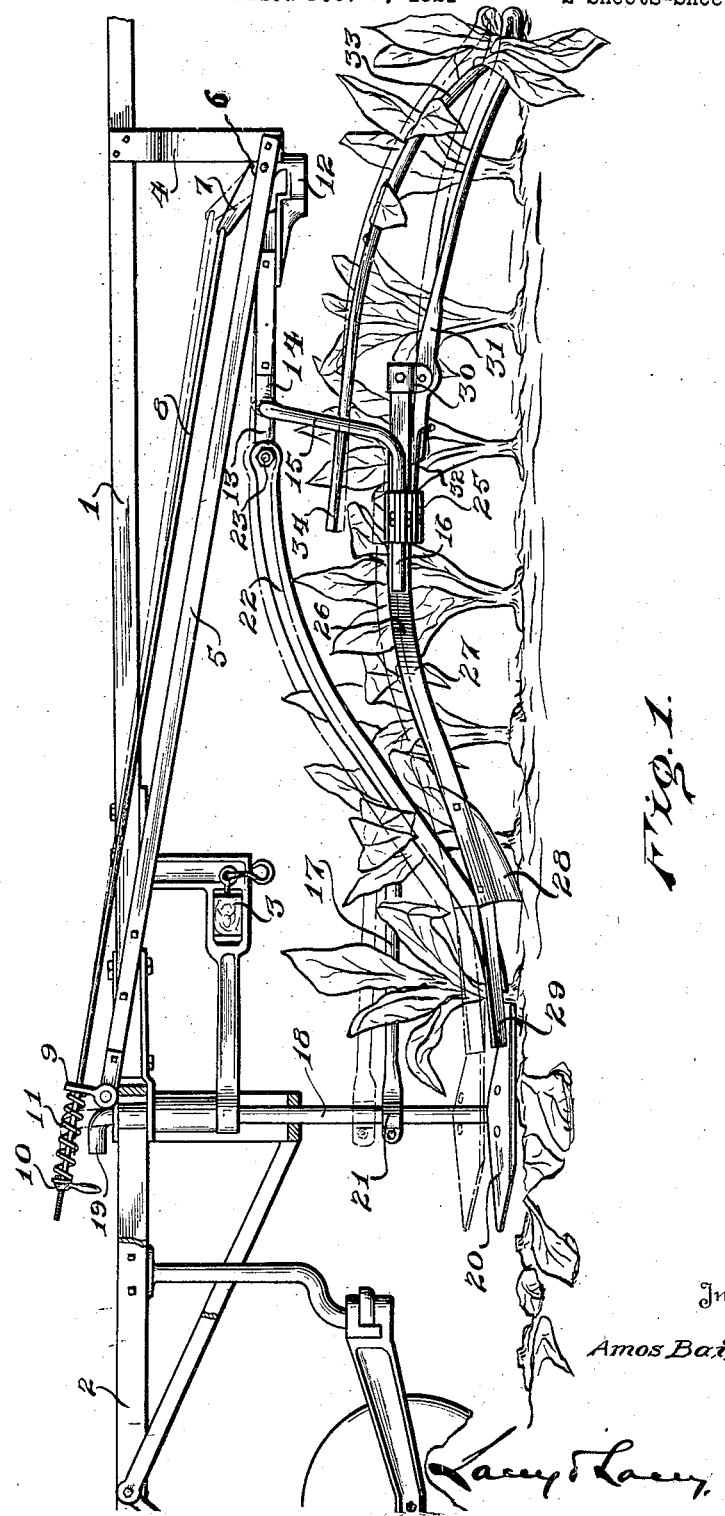

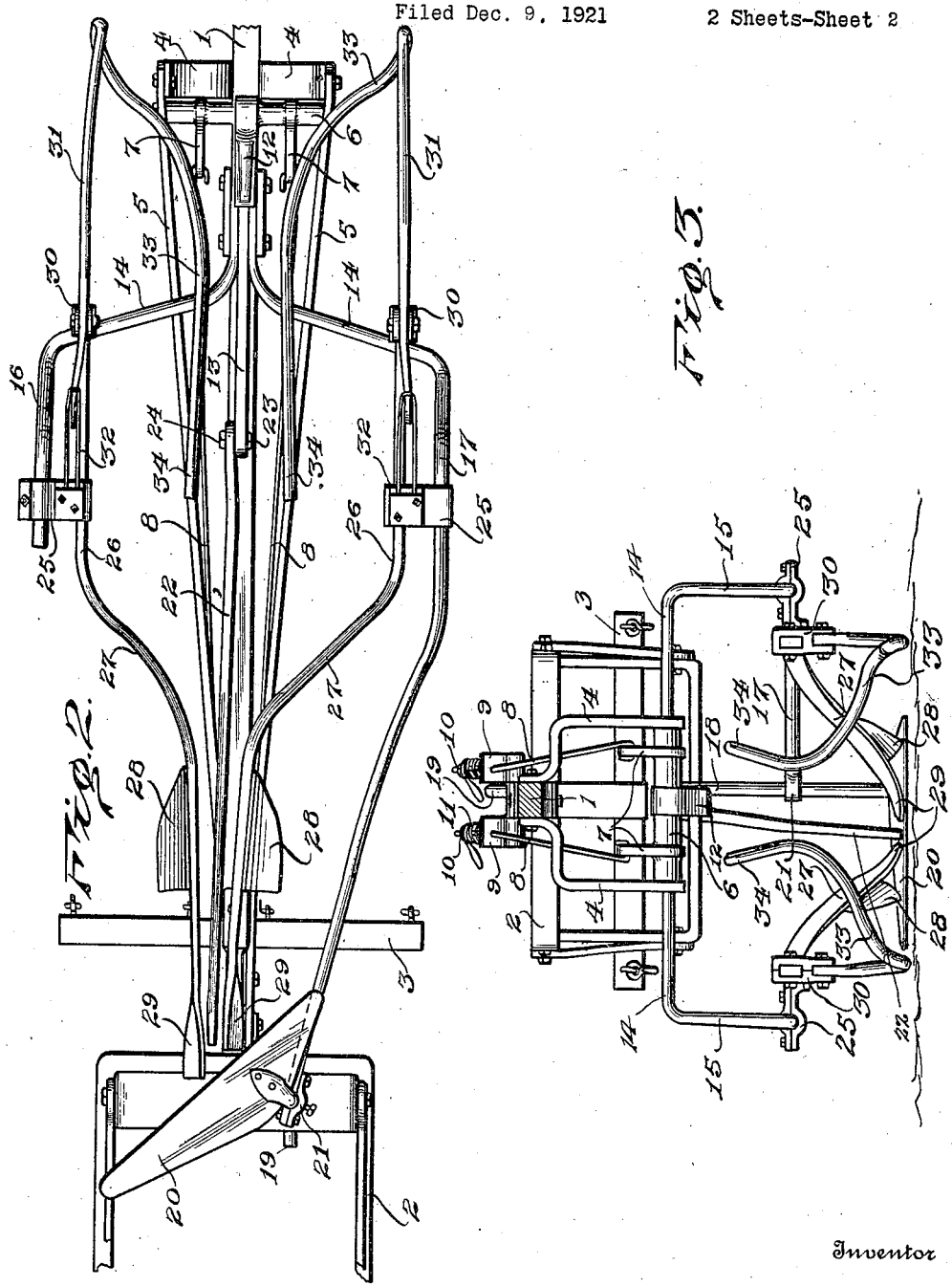

1,467,415

UNITED STATES PATENT OFFICE.

AMOS BAILEY, OF OTTUMWA, IOWA.

BEET TOPPER.

Application filed December 9, 1921. Serial No. 521,138.

*To all whom it may concern:*

Be it known that I, AMOS BAILEY, a citizen of the United States, residing at Ottumwa, in the county of Wapella and State of Iowa, have invented certain new and useful Improvements in Beet Toppers, of which the following is a specification.

This invention seeks to provide an attachment for beet harvesters which may be readily applied to any type of harvester and which, when in use, will pick up fallen beet tops and support them in an upright position so that the crown of the beet may be removed without leaving any of the tops or leaves attached to the beet. The invention also seeks to provide a device whereby the crowns of the beets will be cut off at a uniform height and also to provide means whereby the small tendrils which shoot out in all directions from extra large beets may be cut off before the beets are gathered. The invention also has for its object the provision of means whereby the leaf-raising elements may be permitted to automatically accommodate themselves to unevennesses in the ground and also to provide means whereby the beet engaging members will be returned quickly to a low position after riding over an abnormally high beet. These several stated objects of the invention and other objects which will incidentally appear in the course of the following description are attained in such mechanism as is illustrated in the accompanying drawings and the invention resides in certain novel features which will be hereinafter first fully described and then particularly pointed out in the appended claims.

In the drawings—

Figure 1 is a side elevation of my improved device;

Fig. 2 is a bottom plan view of the same;

Fig. 3 is a front elevation.

In the drawings, the reference numeral 1 indicates a draft tongue projecting forward from the frame 2 of the beet harvester which may be of any preferred or well-known type. Supported by the tongue and the front end of the frame 2 are draft devices 3 to which draft animals may be connected. At a proper point in advance of the main frame, I secure to the tongue depending brackets or hangers 4 and between the lower ends of said hangers and the rear end of the tongue extend braces 5 which are secured to the hangers and the tongue respectively and thereby impart rigidity to the hangers. Carried by the lower end of the hangers or by the braces 5 is a rock shaft 6 having upwardly extending crank arms 7 to which are attached the ends of tension rods 8 which extend upwardly and rearwardly from the said cranks to and through brackets 9 on the tongue or the frame 2 and are equipped with hand nuts 10 between which and the said brackets, springs 11 are coiled around the tension rods. By turning the nuts so that they will move forwardly or rearwardly upon the rods 8, the tension of the springs 11 may be readily regulated and the pressure exerted upon the beet-engaging members thereby controlled. Upon the under side of the rock shaft 6 is a bracket or frame 12 to which is secured a central rearwardly extending arm 13 and the side arms 14 which diverge laterally and are turned downwardly, as shown at 15, the extremity 16 of one of said arms being turned rearwardly to be disposed near the surface of the ground. The rearwardly turned portion 17 of the arm at the opposite side of the machine is extended to the rear end of the device where it is attached to a standard or post 18 supported in suitable brackets or guides upon the frame 2. The upper end of this post 18 is turned rearwardly to provide a stop 19 which, by engaging the upper portion of the frame 2, will prevent the post dropping out of place or dropping so low as to invite injury to the main blade 20 carried by the lower end of the post. The rear extremity of the portion 17 is clamped to the post 18 just above the blade 20, as shown at 21, and it will thus be readily seen that any movement of the frame consisting of the side arms 14 and the extension 17 will be imparted to the blade 20. To the rear extremity of the central arm 13, I secure the front end of a presser or gage arm 22 which extends rearwardly and downwardly from the arm 13 and is adapted to ride over the beets as the machine is drawn along the row. The presser or gage arm 22 is connected pivotally to the arm 13 by a bolt 23 fitted with a nut 24, and it will be readily understood that by loosening the nut the arm 22 may be adjusted pivotally relative to the arm 13 and if the nut be then again turned home, the presser arm will be held in the adjusted position. The said presser arm can thus be readily set to the heights of the beets and it will, of course, be understood that as this arm rides over a beet the entire frame will be raised about the bearing of the rock shaft 6, the knife 20 following such movement so that it will always cut the beet at the same distance from the extreme top thereof.

Secured to the portions 16 and 17 of the respective side arms 14 are clamps or couplings 25 whereby side gage arms 26 are supported, the said gage arms 26 converging rearwardly in rear of the said couplings 25, as shown at 27, and then extending rearwardly at opposite sides of the presser bar 22 and slightly converging toward the same. Knives 28 are secured to these side arms 26 in rear of the sharply converging portions 27 and these knives are adapted to run at the sides of the beets and cut off the wild straggling growth which detracts from the market value of the beets. The rear extremities of these side arms are flattened, as shown at 29, and slightly twisted so that their lower edges diverge or present a flared arrangement whereby the side arms are adapted to engage the sides of the beet and hold the same firmly, while the blade 20 penetrates the same, it being readily noted upon reference to Fig. 2 that the portions 29 extend to points near and in front of the blade and consequently the blade will begin to act upon the beet before the members 29 clear the same.

The gage arms 26 project forwardly from the couplings 25, and upon their front extremities I secure loops or hangers 30 in which are pivotally fitted the lower members 31 of leaf-raising devices. The members 31, as shown clearly in Fig. 1, are adapted, at their front ends, to run upon the ground at the sides of the row of beets and their rear ends extend in rear of the loops 30 and are engaged by springs 32 secured to and projecting forwardly from the couplings 25, as shown clearly in Figs. 1 and 2. These springs exert an upward pressure upon the rear ends of the running members 31 so that the front ends thereof will be held to the surface of the ground but if the said front ends should strike a stone or other obstruction, the springs will yield so that the said obstruction may be readily cleared, and, after it has been cleared, the springs will at once return the runners to their normal positions. The leaf-engaging portions 33 of these leaf-raising elements are preferably formed integral with the front ends of the members 31 and they extend inwardly and upwardly therefrom to points spaced from the central carrying arm 13 and then extend rearwardly in substantially parallel lines, as shown at 34, the rear extremities of these members being free. It will be readily understood that as the machine is drawn over the field along the row of plants, the leaf-raising elements will engage under the fallen leaves and lift the same, as clearly shown in Fig. 1, and will support them in approximately an upright position bunched toward the center of the apparatus and as the progress of the machine continues the leaves so raised will be engaged by the rear portions of the side gage arms and will be prevented from dropping beyond the path of the knife 20.

It is thought the operation and advantages of my machine will be readily understood from the foregoing description, taken in connection with the accompanying drawings, and it will be seen that I have provided a very simple mechanism which may be easily attached to any beet-harvesting machine. As the machine is drawn over the field, the gage and presser arms will straddle the row of plants and the knife 20 will extend across the row. The converging portions of the side arms will engage the sides of the beets and will straighten them so that they will be presented uniformly to the blade 20. Should a tall beet be encountered, the presser arm 22 will ride over the top of the same and the entire frame will then be swung upwardly about the axis of the rock shaft 6 so that the springs 11 will be put under increased tension. The blade 20 follows immediately behind the presser arm so that it will cut part way through the beet before the arm clears the same and as the support for the knife is connected rigidly with the other parts of the frame, the knife will follow the vertical movement of the presser arm and the frame so that the cut will always be made at the same distance from the crown of the beet. As soon as the high beet is cleared, the springs 11 will expand and thereby rock the shaft 6 so as to return the parts to the normal position and the next beet will be, of course, cut at a lower point relative to the ground provided it be a shorter beet. The force of the springs 11 may be adjusted so that even if the crown of the beet be below the surface of the ground it will be cut in the desired manner. My device does not add materially to the draft of the machine and by its use the beets will be topped uniformly and rapidly so that they will have a good market value and time and labor in the topping operation will be saved.

Having thus described the invention, what is claimed as new is:

1. A beet-topping mechanism comprising converging side arms adapted to engage the sides of the beets, means whereby said side arms will be automatically adjusted to the height of the beets, and a knife carried at the rear ends of said arms.

2. A beet-topping mechanism comprising leaf-raising members, converging side gages disposed in rear of the leaf-raising members, a knife at the rear ends of said side gage arms, and means for effecting vertical adjustment of the said arms by engagement with the beets.

3. A beet-topping mechanism comprising a pivotally supported frame including rearwardly converging side gage arms, knives carried by said arms, a knife carried by the frame in rear of the first-mentioned knives, a presser bar carried by the frame and adapted to ride over the beets and thereby effect vertical pivotal movement of the frame, and means for normally holding the frame in a lowered position.

4. In a beet-topping mechanism, the combination of a pivotally mounted frame, rearwardly converging gage arms carried by said frame, a knife carried by the frame, a presser bar carried by the frame and disposed to ride over the beets between the said gage arms, and leaf-raising members pivotally mounted at the front ends of said gage arms and having their front ends yieldably held to the ground.

5. A beet-topping mechanism comprising a rock shaft, cranks extending upwardly and rearwardly from said rock shaft, tension means acting upon said cranks to hold them normally in a rear lowered position, a frame secured to the under portion of the rock shaft, rearwardly converging gage arms carried by said frame, a knife carried by said frame and disposed adjacent the rear extremities of said gage arms, a presser arm carried by said frame and having its rear end disposed to ride on the beets between the rear extremities of said cage arms, and leaf-raising members carried by the front ends of said gage arms.

6. In a beet-topping mechanism, the combination of a vertically movable frame, gage arms carried by said frame, a knife supported by said frame adjacent the rear ends of the gage arms, leaf-raising members pivotally mounted on the front ends of the gage arms and having inwardly and rearwardly extending leaf-engaging portions, and springs secured upon the frame and engaging the rear ends of said leaf-raising members whereby to hold the front ends of the same yieldably to the surface of the ground.

7. A beet-topping mechanism comprising a rock shaft, cranks extending upwardly and rearwardly from said rock shaft, tension means acting upon said cranks to hold them normally in a rear lowered position, a frame secured to the under portion of the rock shaft, rearwardly converging gage arms carried by said frame, a knife carried by said frame and disposed adjacent the rear extremities of said gage arms, and a presser arm carried by said frame and having its rear end disposed to ride on the beets between the rear extremities of said gage arms.

8. In a beet-topping mechanism, the combination of a frame, leaf-raising members pivotally mounted between their ends at the front of the frame and having inwardly and rearwardly extending leaf-engaging portions, and springs secured upon the frame and engaging the under sides of the rear ends of said leaf-raising members whereby to hold the front ends of said members yieldably to the surface of the ground.

In testimony whereof I affix my signature.

AMOS BAILEY. [L. S.]